J. M. & R. R. DENNIS.
PNEUMATIC WHEEL.
APPLICATION FILED JAN. 15, 1912.

1,047,621.

Patented Dec. 17, 1912.
2 SHEETS—SHEET 1.

Inventors:
James M. Dennis,
Russell R. Dennis,

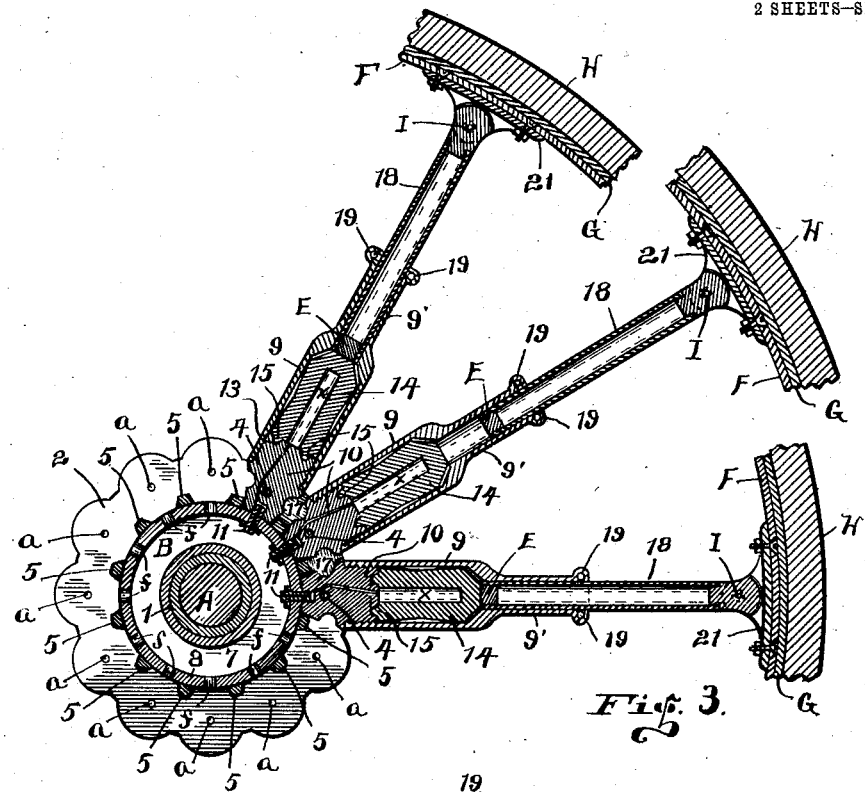
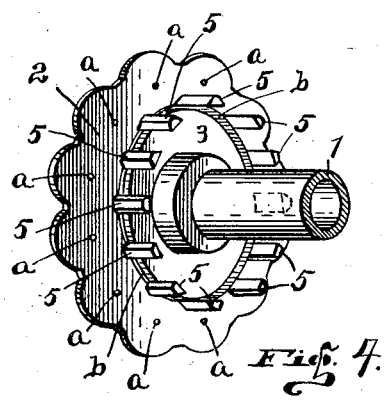
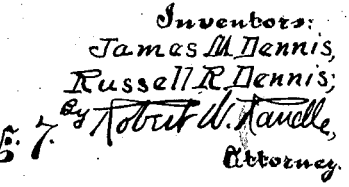

UNITED STATES PATENT OFFICE.

JAMES M. DENNIS AND RUSSELL R. DENNIS, OF CAMBRIDGE CITY, INDIANA.

PNEUMATIC WHEEL.

1,047,621.  Specification of Letters Patent.  Patented Dec. 17, 1912.

Application filed January 15, 1912.  Serial No. 671,265.

*To all whom it may concern:*

Be it known that we, JAMES M. DENNIS and RUSSELL R. DENNIS, both citizens of the United States, residing in Cambridge City, in the county of Wayne and State of Indiana, have made certain new and useful Improvements in Pneumatic Wheels, of which the following is a specification.

Our present invention proposes to provide a construction containing certain changes and improvements over that set up in our prior application for patent on pneumatic wheels, filed in the Patent Office under date of November 23, 1911, Serial No. 661,877, now pending in Div. 41, room 125. As in the said prior patent this invention depends also upon the compressibility of air contained in an air chamber, but with the difference that in this instance the air is to be forced into the air chamber by means entirely outside and distinct from this invention, and not automatically as in our former application.

The object of our present invention, broadly speaking, is to provide a pneumatic vehicle-wheel having a maximum of self-contained pneumaticity without the employment of pneumatic tires, the air under pressure being contained within the spokes of the wheel and in an air chamber contained in the hub of the wheel, said air chamber having interior communication with the interiors of all of the spokes.

The particular objects of our invention is to provide a wheel for vehicular traffic having a hub with an air chamber therein, a plurality of telescoping spokes, and a resilient cushion located in each of the spokes, and also having means for pivoting the ends of the spokes to the hub and to the rim of the wheel.

Other advantages and objects of this invention will be made apparent in the course of the following specification.

The means for carrying out our invention in a practical manner is shown in the accompanying drawings, in which—

Figure 1:
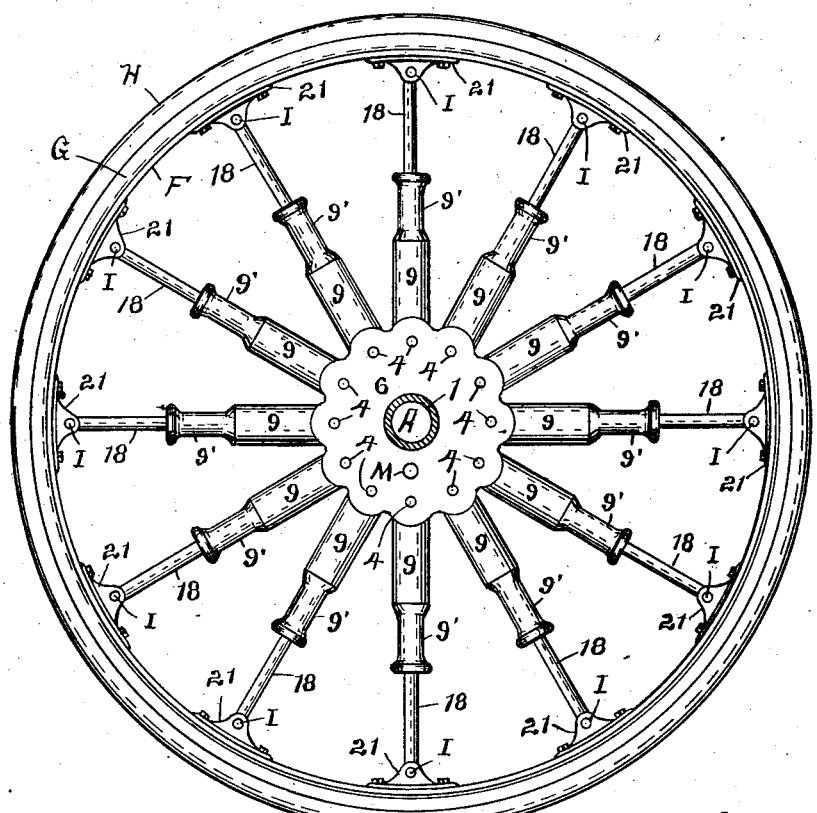
Figure 9:
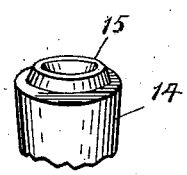
Figures 2, 10:
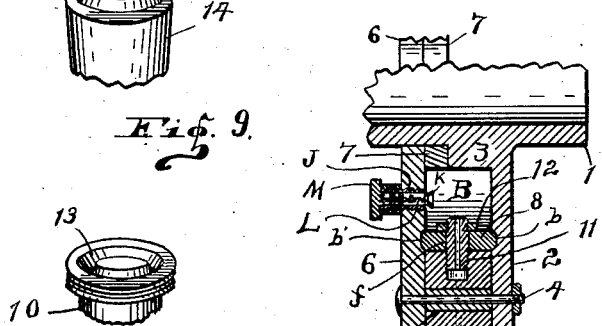
Figure 11:
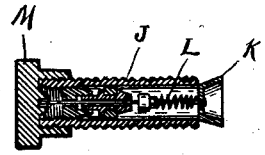

Figure 1 is a front or face view of our wheel complete. Fig. 2 is an enlarged cross sectional detail view of a portion of the hub and a portion of one of the spokes. Fig. 3 is an enlarged fragmentary detail view of a portion of our wheel, being a central circumferential section thereof, showing one of the spokes extended to its limit, the other two spokes shown being in position allowing the pistons to be cushioned. Fig. 4 is a perspective view of a portion of the wheel hub, showing the interior thereof. Fig. 5 is a detail view showing in perspective the inner portion of one of the spokes of our wheel. Fig. 6 is a central section of the outer portion of one of the cylinder members of the spokes. Fig. 7 is a detail view showing the end portion of one of the piston members of the spokes. Fig. 8 is an end view of the inner end of one of the piston members of the spokes, and showing the plug therein. Fig. 9 is a perspective view of the lower end of one of the main cushions which are located in the cylinders of the spokes. Fig. 10 is a perspective view of the outer end of the head of one of the spokes. And Fig. 11 is an enlarged detail view, in section, of the air inlet valve.

Similar indices denote like parts throughout the several views of the two sheets of drawings.

In order that the invention may be better understood we will now take up a detailed description thereof in which we will describe the several parts as briefly and as comprehensively as we may.

The central portion of our wheel consists of a hub, comprising the thimble 1 which is adapted to revolve on the shaft A. Formed integral with and extending out at right-angles from the thimble 1 is the fixed plate 2, whose periphery is escalloped, there being one segmental escallop for each spoke to be employed in the wheel. Extending inward, around thimble 1, from the central portion of the plate 2, is the collar 3. Formed through plate 2 are a plurality of apertures *a*, one for each of said escallops, and each is located concentric with its respective escallop as indicated, and each of which is adapted to receive therethrough its respective bolt 4. Extending inward from the inner face of the plate 2 are a plurality of equi-spaced lugs, which are substantially triangular in cross section, that is the faces thereof which are directed toward the collar 3 are wider than are the opposite or outer faces, each of said lugs is indicated by index 5, they are all an equal distance from the collar 3, and they are so arranged that a line drawn from the center of the hub to either one of the apertures *a* would pass midway between two of said lugs. Formed around in the inner face of plate 2, immediately inside the inner faces of the lugs 5 is a groove b.

Numeral 6 denotes the removable plate which is of same size and shape as the plate 2 of which it is a complement. Formed through plate 6 are a plurality of bolt holes, each one of which is in alinement with one of the holes a of plate 2, and they also are adapted to receive therein the bolts 4, as shown in Fig. 2. Said plate 6 has a central aperture therethrough in which will fit the thimble 1 in order to allow plate 6 to be brought to position as in Fig. 2. Formed around in the inner face of plate 6, directly opposite said groove b and corresponding thereto, is the groove b' which is shown only in cross section and that in Fig. 2. Surrounding thimble 1 and adjoining the collar 3 is the resilient gasket 7, shown in Fig. 3, against which plate 6 will contact when it is in position.

Numeral 8 denotes a band formed preferably of rubber, or other resilient or pliable material, having one of its edges fitting in the groove b and the other in groove b', being adapted to be clamped tightly in place when the plates 2 and 6 are secured together as in Fig. 2. In order to prevent the plates 2 and 6 from being clamped too tightly or brought too near together we provide a thimble e for each bolt, through which the bolts are disposed, the said thimbles being of such length as to retain said plates the proper distance apart, also allowing the bolts to be made very tight without danger of bringing the plates too near together. It will now be observed that an air-chamber or reservoir B is formed between the band 8, the plates 2 and 6, the collar 3, and the gasket 7, which chamber extends entirely around the hub, as shown in Fig. 3. A plurality of apertures f are formed through the band 8, there being one between each two of the lugs 5, as in Fig. 3.

We will now take up a description of the spokes, in this instance there being twelve in number, and as they are all alike in every particular, a description of one will answer for all, corresponding parts being indicated by like indices.

The body of each spoke comprises the cylindrical casing 9, having a neck portion 9' extending outward from the outer end thereof. Secured in the inner end of the casing 9 is the head 10, which has an aperture h formed therethrough in an axial direction through which may be disposed a bolt 4, as in Fig. 3. The inner end portion of the heads 10 are formed tapering or wedge-shaped, each fitting between two of the lugs 5. Extending centrally into the head 10, from the point thereof, is an aperture, which is at right angles to aperture h, in which is threaded the hollow nipple 11, the latter having the nut 12 threaded thereon as shown. Formed across, parallel with aperture h, on each side of the beveled portion of the head 10 are the half-round grooves i and j, same being in alinement with said aperture h. Formed around concentrically in the upper end of the head 10 is a channel 13.

Letter D denotes an air duct leading from nipple 11 through head 10, being formed in such manner as to pass around or avoid aperture h. The inner end or point of the head 10 contacts with the band 8, with the nipple 11 disposed through an aperture f, and with the nut 12 engaging the inner periphery of the band 8, as in Fig. 3.

Numeral 14 denotes a bell-shaped cushion, there being one located in each casing 9. At each end the cushion 14 is of such size as to fill the interior of the cylinder 9, but it is formed concave on its periphery from end to end thereof, and the upper edge of each of said cushions is beveled whereby the extreme upper end thereof is of substantially the same diameter as is the interior of the neck 9'. The interior of said cushion is formed hollow, the upper end being closed and the lower end being open, as shown. Formed on the lower end of cushion 14 is the concentric tongue, 15, same being located around the aperture in the lower end and being adapted to fit in the channel 13.

After the several heads have been positioned and secured by the respective pivot bolts 4 we fill the spaces between each two of the heads 10 and one of the lugs 5 with packing 17 which forms a dust-proof joint and also contributes to cushioning the spokes.

Numeral 18 denotes the piston which fits in and is adapted to operate in the neck 9', there being a head E secured on the inner end thereof. Formed around in the outer enlarged portion of the neck 9' is a channel in which is placed the packing 19 through which said piston 18 operates. In the outer end of piston 18 is threaded the plug or ear 20 which is flattened in the direction at right-angles to shaft A, with a pivot aperture formed through said flattened portion to receive the pivot bolt I. F designates a band which is connected to the rim G, the latter being adapted to carry the tire H. Secured around to and in contact with the inner periphery of the band F is a plurality of hangers 21 in each of which is pivotally connected the flat portion of one of said ears 20, the connections being made by the said pivot-bolts I.

From the above it will be noticed that each end of the spokes are pivoted in such manner as to allow them to have a limited movement circumferentially independent of the hub and the rim, that is at right angles to the shaft, but they will not be movable in an axial direction or parallel with the shaft. The outer ends of the spokes and the hangers 21 are provided with corresponding curved shoulders which nest together in such manner as to allow the members 18 and 21 to turn with relation to each other but without undue strain upon the respective pivot-bolts I. Also in like manner the heads 10 are pivoted between the plates 2 and 6, the peripheries of the disks being escalloped and the sides of the heads being provided with curved shoulders which fit and are adapted to slide on their respective escallops of the plates in such manner as to relieve the bolts 4 of undue strain.

Formed through the plate 6 is an aperture which leads into the air-reservoir B. Threaded into said aperture is an admission valve through which air may be forced into the reservoir B. Said admission valve comprises a stem J which is threaded into said aperture in plate 6. Normally closing the inner end of stem J is the disk K which is normally held against its seat by the spring L. Covering the outer end of the stem J is the removable cap M.

In practice the cap M is first removed and an air pump (not shown) is then connected to the stem J, and by means of the pump a plenitude of air is forced into the reservoir B which, of course, will fill the air-chambers $x$ in the several cushions 14, causing said cushions to expand to their limits of confinement and thereby increasing their resiliency and prolonging their utility. Now as the wheel revolves in the usual manner, carrying the load incident thereto, the pistons 18 will be pushed inward, progressively, thereby forcing the heads E against the outer ends of the cushions 14, which act both mechanically and pneumatically. The comparatively large head of compressed air which should be contained in the reservoir B, in combination with that contained in the several chambers $x$, provide a maximum of resiliency, thereby causing the load carried by the wheel to ride without apparent jar which is usually incident to vehicular traffic.

The predominant feature of this invention is that each of the air-chambers in the spokes are connected together and then each is in connection with a larger or central reservoir, thereby forming a construction wherein each of the several telescoping spokes and its cushion is complete *per se*, yet the coherent total of all are combined to form a unitary structure in which the several parts must move in turn to produce the desired efficiency.

It is to be understood that we are not to be limited to the details of construction herein shown and described, but that various changes may be made therein within the limits of the claims.

Having now fully shown and described our invention, that which we claim and desire to secure by Letters Patent, is—

1. A pneumatic wheel comprising in combination a hub having an air reservoir therein, a plurality of telescoping spokes each pivoted in and radiating from said hub, a rim carried by and pivoted to the outer ends of the spokes, a bell-shaped cushion having a concave periphery located in the cylinder portion of each spoke and each having an air-chamber therein, there being a channel leading from each air-chamber into the said reservoir, and a valve located in the hub through which air may be forced into the reservoir, all substantially as shown and described.

2. A pneumatic wheel having a hub with an air reservoir therein, a plurality of telescoping spokes each comprising a cylinder portion and a piston portion, a head carried by the inner end of the cylinder portion of each spoke, means for pivoting each of said heads in the periphery of the hub, there being a channel form through each head and leading from said reservoir to the interior of the cylinder thereto attached, an oblong and bell-shaped cushion located in the cylinder portion of each spoke having an air-chamber therein with a single outlet therefrom and that leading through the respective heads into said reservoir, an outer rim, means for pivotally connecting the outer ends of all of the pistons to said rim, the pivotal connection of the pistons with the rim and the heads with the hub being such as to allow the hub to have a limited circumferential movement independent of the movement of the rim, and a valve through which air may be inserted into said reservoir, all substantially as shown and described.

3. A vehicle wheel comprising in combination a hub having an air reservoir therein and comprising a spindle, a fixed plate connected to the spindle, a detachable plate fitting around the spindle and being a complement of the fixed plate, a row of lugs extending inward from the fixed plate toward the removable plate, a band extending around between the plates and forming the outer wall of the reservoir, means for clamping said plates upon said band, a head having its point located between each two of said lugs and pivoted between said plates, a cylinder extending outward from each of said heads and having interior communication with said reservoir through a channel formed through the head, a hollow bell-shaped cushion located in each of said cylinders with its interior communicating only with said reservoir, a piston adapted to operate in each of said cylinders and adapted to contact with the said cushion, a rim surrounding the hub, pivotal connections between each piston and the rim, and an air valve in the hub through which air may be inserted into the reservoir, all substantially as shown and described.

4. A vehicle wheel comprising a hub having a reservoir therein and including a spindle, a fixed plate connected to the spindle, a detachable plate loose on the spindle and being a complement of the fixed plate, a row of lugs extending inward from the fixed plate toward the removable plate, a band extending around between the plates and forming the outer wall of the reservoir, a head located between each two of said lugs and pivoted between said plates, a cylinder extending outward from each of said heads and having interior communication with said reservoir through a channel formed in each of said heads, a hollow cushion located in each of said cylinders, a piston adapted to operate in each of said cylinders and adapted to contact with the cushions, a solid rim surrounding the hub, pivotal connections between each piston and the rim, and an admission valve through which air may be inserted into the reservoir, all substantially as shown and described.

In testimony whereof we have hereunto subscribed our names in the presence of two subscribing witnesses, Jan. 11, 1912.

JAMES M. DENNIS.
RUSSELL R. DENNIS.

Witnesses:
JOHN C. DODSON,
ROBERT W. RANDLE.

---

Copies of this patent may be obtained for five cents each, by addressing the "Commissioner of Patents, Washington, D. C."